(12) United States Patent
Mayr et al.

(10) Patent No.: US 11,639,161 B2
(45) Date of Patent: May 2, 2023

(54) HYDRAULIC POWER VEHICLE BRAKE SYSTEM AND METHOD FOR FILLING A HYDRAULIC POWER VEHICLE BRAKE SYSTEM

(71) Applicant: Robert Bosch GmbH, Stuttgart (DE)

(72) Inventors: Matthias Mayr, Rettenberg (DE); Andreas Weh, Sulzberg (DE); Juergen Tandler, Fuessen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 228 days.

(21) Appl. No.: 17/106,843

(22) Filed: Nov. 30, 2020

(65) Prior Publication Data
US 2021/0188232 A1    Jun. 24, 2021

(30) Foreign Application Priority Data
Dec. 20, 2019 (DE) .......................... 102019220355.8

(51) Int. Cl.
| B60T 13/74 | (2006.01) |
| B60T 8/40 | (2006.01) |
| B60T 8/44 | (2006.01) |
| B60T 13/68 | (2006.01) |
| B60T 13/16 | (2006.01) |
| B60T 13/58 | (2006.01) |
| B60T 13/14 | (2006.01) |

(52) U.S. Cl.
CPC ............ B60T 8/4072 (2013.01); B60T 8/441 (2013.01); B60T 13/142 (2013.01); B60T 13/161 (2013.01); B60T 13/588 (2013.01); B60T 13/686 (2013.01)

(58) Field of Classification Search
CPC ...... B60T 13/745; B60T 8/4081; B60T 8/409; B60T 17/222; B60T 8/4072; B60T 8/441; B60T 13/142; B60T 13/161; B60T 13/588; B60T 13/686
See application file for complete search history.

(56) References Cited

U.S. PATENT DOCUMENTS

| 2002/0084693 | A1* | 7/2002 | Isono | B60T 8/4018 303/113.1 |
| 2005/0110341 | A1* | 5/2005 | Kusano | B60T 11/16 188/152 |
| 2005/0236892 | A1* | 10/2005 | Kusano | B60T 11/20 303/155 |
| 2006/0152072 | A1* | 7/2006 | Baechle | B60T 8/34 303/3 |
| 2006/0192426 | A1* | 8/2006 | Baechle | B60T 17/222 303/119.1 |

(Continued)

FOREIGN PATENT DOCUMENTS

WO    2012150120 A1    11/2012

*Primary Examiner* — Bradley T King
(74) *Attorney, Agent, or Firm* — Norton Rose Fulbright US LLP; Gerard Messina

(57) ABSTRACT

A pedal-travel simulator of a hydraulic power vehicle brake system is connected to a brake-fluid reservoir by way of a groove between two piston seals of a power brake-pressure generator. Any air bubbles in the brake fluid get out of the pedal-travel simulator into the brake-fluid reservoir, and the piston seals are lubricated with the brake fluid.

5 Claims, 3 Drawing Sheets

(56) References Cited

U.S. PATENT DOCUMENTS

| | | | |
|---|---|---|---|
| 2012/0193975 A1* | 8/2012 | Ishii | B60T 8/4081 |
| | | | 303/14 |
| 2013/0232966 A1* | 9/2013 | Murayama | B60T 7/042 |
| | | | 60/545 |
| 2014/0028084 A1* | 1/2014 | Biller | B60T 8/4081 |
| | | | 303/9.62 |
| 2014/0216866 A1* | 8/2014 | Feigel | B60T 17/00 |
| | | | 188/156 |
| 2016/0221553 A1* | 8/2016 | Watanabe | B60T 8/4081 |
| 2018/0201247 A1* | 7/2018 | Koshimizu | B60T 11/34 |
| 2019/0092307 A1* | 3/2019 | Kim | G05G 5/05 |
| 2020/0216055 A1* | 7/2020 | Lee | B60T 13/745 |

* cited by examiner

HYDRAULIC POWER VEHICLE BRAKE SYSTEM AND METHOD FOR FILLING A HYDRAULIC POWER VEHICLE BRAKE SYSTEM

CROSS REFERENCE

The present application claims the benefit under 35 U.S.C. § 119 of German Patent Application No. DE 102019220355.8 filed on Dec. 20, 2019, which is expressly incorporated herein by reference in its entirety.

FIELD

The present invention relates to a hydraulic power vehicle brake system, as well as a method for filling a hydraulic power vehicle brake system.

BACKGROUND INFORMATION

PCT Patent Application WO 2012/150120 A1 describes a hydraulic power vehicle brake system having a brake master cylinder operable by muscular energy, and a power brake-pressure generator which has a piston/cylinder unit whose piston is displaceable in a cylinder by an electric motor via a screw drive in order to generate a brake pressure. The brake master cylinder is used as setpoint generator for the brake pressure to be generated by the power brake-pressure generator. Connected to the brake master cylinder is a piston/cylinder unit having a spring-loaded simulator piston as pedal-travel simulator, into whose simulator cylinder brake fluid is displaceable out of the brake master cylinder, so that a brake-master-cylinder piston and a foot-brake pedal are movable when the brake master cylinder is disconnected hydraulically from the vehicle brake system by closure of an isolation valve in the case of a power operation of the vehicle brake system.

SUMMARY

A hydraulic power vehicle brake system according to an example embodiment of the present invention has a brake master cylinder, an especially pressureless brake-fluid reservoir, a power brake-pressure generator, one or more hydraulic wheel brakes and a pedal-travel simulator having a piston/cylinder unit with a simulator piston which is displaceable in a simulator cylinder. The wheel brake/s is/are connected—particularly via inlet valves—to the power brake-pressure generator, so that they are operable using the power brake-pressure generator. Preferably, the wheel brake(s) is/are connected—likewise via valves—to the brake master cylinder, so that in the event of a fault or failure of the power brake-pressure generator, they are operable using the brake master cylinder.

For example, the brake master cylinder is operable by muscular energy via a foot-brake pedal or a handbrake lever; it may also have a brake booster, so that it is operable with power assistance, that is, operable with muscular energy boosted by a power assist of the brake booster.

In the case of a power operation, the brake master cylinder is disconnected hydraulically from the remaining vehicle brake system by the closure of isolation valves, and is connected at a front end of the simulator piston to the simulator cylinder of the pedal-travel simulator, so that brake fluid is able to be forced out of the brake master cylinder into the simulator cylinder. As a result, a brake-master-cylinder piston is able to be shifted in the brake master cylinder, and the foot-brake pedal or the handbrake lever are able to be moved. In particular, the simulator piston is acted upon by a spring, so that it resists the brake fluid forced into it from the brake master cylinder, the resistance increasing with increasing travel of the piston, so that an actuating force of the brake master cylinder increases with increasing travel of the foot pedal or handbrake lever, as in the case of conventional hydraulic vehicle brake systems.

According to the present invention, at a back end of the simulator piston, the simulator cylinder is connected to the brake-fluid reservoir, so that when the simulator piston is shifted in the simulator cylinder, it forces brake fluid at its back end out of the simulator cylinder into the brake-fluid reservoir. In addition to the simulator cylinder being filled at the front end of the simulator piston, this also allows it to be filled at the back end of the simulator piston, the simulator piston thereby being lubricated with brake fluid from both ends. In response to the shift of the simulator piston, air possibly contained at the back end of the simulator piston in the simulator cylinder is forced out of the simulator cylinder into the brake-fluid reservoir, where the air escapes from the brake fluid.

Further developments and advantageous refinements of the present invention are described herein.

All features disclosed in the specification and the figures may be realized individually or in basically any combination in specific embodiments of the present invention. Realizations of the present invention which do not have all, but rather only one or more features of a specific embodiment of the present invention, are possible.

BRIEF DESCRIPTION OF THE DRAWINGS

The present invention is explained in greater detail below on the basis of a specific embodiment shown in the figures.

DETAILED DESCRIPTION OF EXAMPLE EMBODIMENTS

Figure 1:
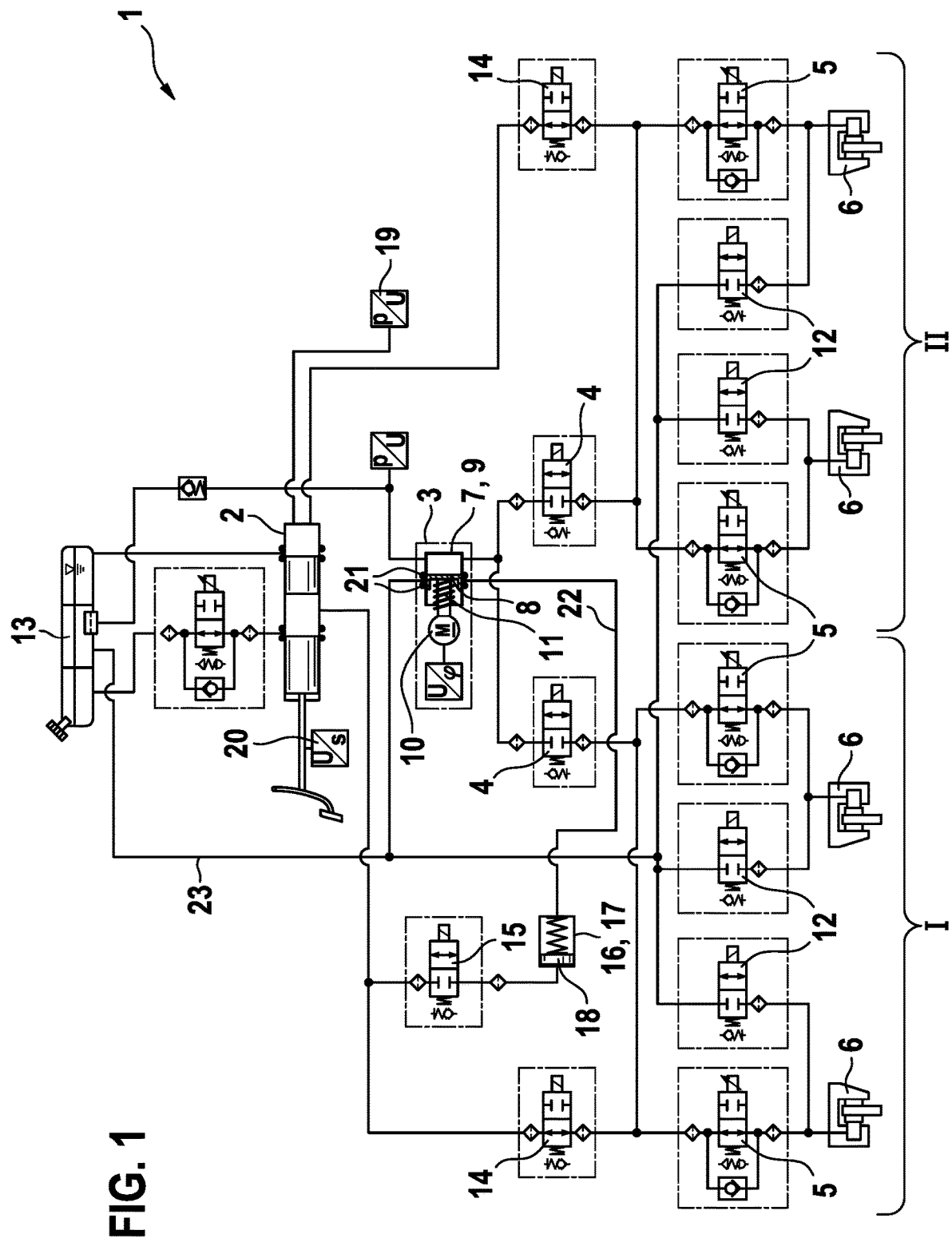
FIG. 1 shows a hydraulic circuit diagram of a hydraulic power vehicle brake system according to an example embodiment of the present invention.

Hydraulic power vehicle brake system 1 according to an example embodiment of the present invention shown in FIG. 1 has, inter alia, a dual-circuit brake master cylinder 2 operable by muscular energy, and a power brake-pressure generator 3 to which hydraulic wheel brakes 6 are connected via power valves 4 and inlet valves 5.

Power brake-pressure generator 3 has a piston/cylinder unit 7 with a power piston 8 that is displaceable in a power cylinder 9 in order to generate a brake pressure. Power piston 8 is displaceable in power cylinder 9 by an electric motor 10 via a helical gear 11, e.g., a ball-screw drive or, in general, a rotation-translation transformation gear. For example, a planetary gear may be disposed as mechanical reduction gear between electric motor 10 and the rotation-translation transformation gear (not shown).

In the exemplary embodiment, vehicle brake system 1 has two brake circuits I, II and four wheel brakes 6, brake circuits I, II being assigned two wheel brakes 6 each. In each brake circuit I, II, wheel brakes 6 of respective brake circuits I, II are connected via inlet valves 5 assigned to them, to power brake-pressure generator 3 by way of power valves 4.

Each wheel brake 6 is assigned an outlet valve 12 via which wheel brakes 6 are connected to a pressureless brake-fluid reservoir 13, that is mounted on brake master cylinder 2.

Inlet valves 5 and outlet valves 12 form a wheel-brake pressure-control valve system, with which a slip control is possible. For example, such slip controls are an antilock braking system, traction control system and/or vehicle dynamics control or electronic stability program, for which the abbreviations ABS, TCS and/or VDC or ESP are customary. Such slip controls are familiar and are not explained in greater detail here. For example, in each brake circuit I, II, the slip control may additionally have a piston pump or an (internal-) gear pump as hydraulic pump (not shown), that is able to be driven by an electric motor. Such hydraulic pumps of slip controls are also referred to as return pumps.

Different numbers of wheel brakes 6 and assignments to brake circuits I, II are possible.

Wheel brakes 6 in each brake circuit I, II are connected by way of an isolation valve 14 and inlet valves 5 to brake master cylinder 2, so that in the event of a fault or a failure of power brake-pressure generator 3, wheel brakes 6 are operable by brake master cylinder 2.

In one of the two brake circuits I, a pedal-travel simulator 16 is connected to brake master cylinder 2 via a simulator valve 15. Pedal-travel simulator 16 features a piston/cylinder unit having a simulator cylinder 17 in which a simulator piston 18, acted upon by a spring, is axially displaceable. At a front end of simulator piston 18, simulator cylinder 17 is connected by way of simulator valve 15 to brake master cylinder 2. At a back end of simulator piston 18, simulator cylinder 17 is connected to pressureless brake-fluid reservoir 13.

In the case of a power braking, brake master cylinder 2 is disconnected hydraulically from vehicle brake system 1, that is, from wheel brakes 6, by closure of isolation valves 14, and connected to pedal-travel simulator 16 by the opening of simulator valve 15, so that brake fluid may be forced out of brake master cylinder 2 at the front end of simulator piston 18 into simulator cylinder 17. The brake pressure is generated by power brake-pressure generator 3, which is connected to wheel brakes 6 by the opening of power valves 4. A brake pressure is able to be regulated by a back-and-forth movement of power piston 8 in power cylinder 9. The brake pressure is adjusted as a function of the actuation of brake master cylinder 2, which during the power braking, is used as setpoint generator for the brake pressure to be generated by power brake-pressure generator 3. For this purpose, brake master cylinder 2 has a pressure sensor 19 and a displacement sensor 20. In principle, one sensor 19, 20, is sufficient; second sensor 20, 19 is provided for the purpose of redundancy.

Power valves 4, inlet valves 5, outlet valves 12, isolation valves 14 and simulator valve 15 are 2/2-way solenoid valves, inlet valves 5 and isolation valves 14 being open in their currentless home positions, and power valves 4, outlet valves 12 and simulator valve 15 being closed in their currentless home positions. Other implementations of the valves and their operating positions are possible.

Power cylinder 9 of piston/cylinder unit 7 of power brake-pressure generator 3 has two axially offset piston seals 21, between which power cylinder 9 is connected to brake-fluid reservoir 13. For that purpose, power cylinder 9 has a circumferential groove between piston seals 21, which goes around power piston 8 and connects a brake-fluid line 22 which comes from pedal-travel simulator 16, to a brake-fluid line 23 which leads to brake-fluid reservoir 13. The groove in power cylinder 9 connecting brake-fluid lines 22, 23 extends over a full circumference or a partial circumference.

Vehicle brake system 1 may have a modular design; for example, brake master cylinder 2 and power brake-pressure generator 3 may be disposed in one module, that is, in one hydraulic block, and the slip control may be disposed in another module, that is, in another hydraulic block (not shown). Brake master cylinder 2 and power brake-pressure generator 3 may also be disposed in separate modules or hydraulic blocks (not shown). However, a construction of vehicle brake system 1 with one module, that is, one hydraulic block is also possible.

Figure 3:
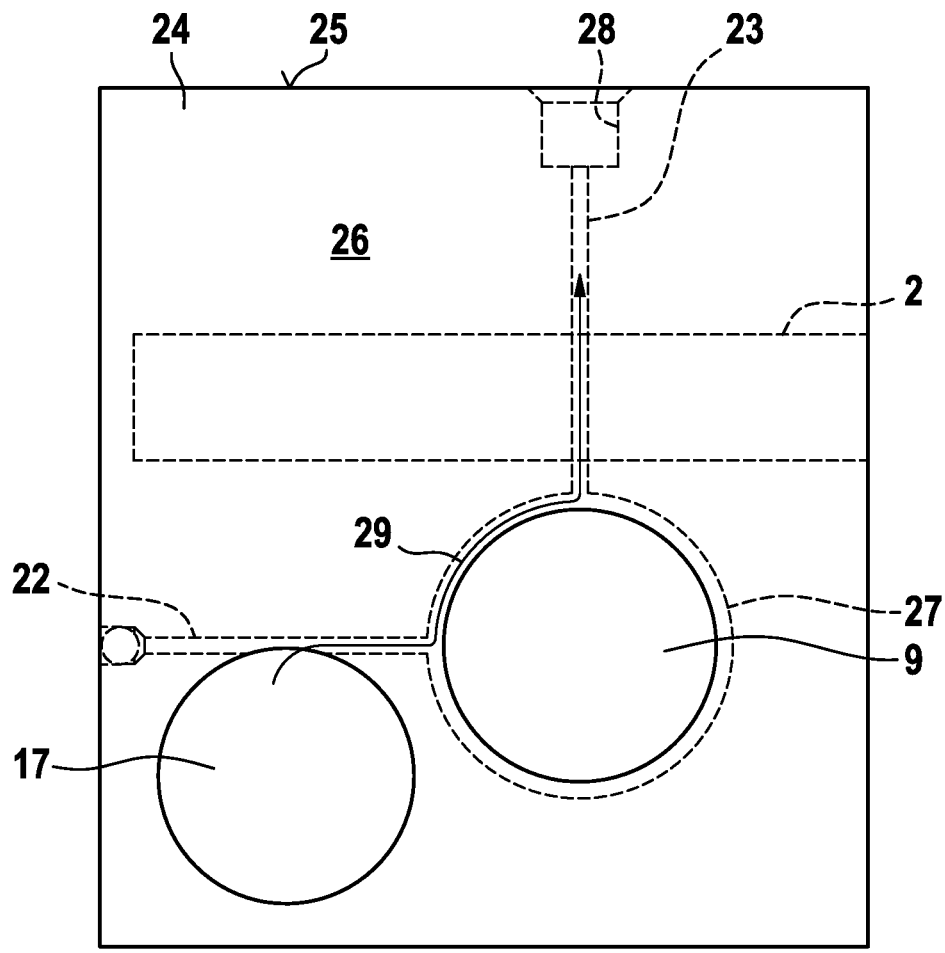
FIG. 3 shows a hydraulic block of the vehicle brake system from FIG. 1 according to an example embodiment the present invention.

FIG. 3 shows a cuboidal hydraulic block 24 of vehicle brake system 1, which has bores as receivers for the elements of vehicle brake system 1 explained above, and which is drilled according to the hydraulic circuit diagram in FIG. 1, in other words, the elements disposed in the receivers are connected to each other according to the hydraulic circuit diagram. In side view, hydraulic block 24 is more or less square and is approximately ¼ to ⅓ as wide as long and/or high. FIG. 3 shows hydraulic block 24 in an intended position of installation and use, in which a narrow side is located at the top as upper side 25. Brake-fluid reservoir 13 mountable on upper side 25, which is not depicted in FIG. 3.

In a large side of hydraulic block 24 facing the viewer, which is denoted here as motor side 26, a power-cylinder bore is placed, which forms power cylinder 9 of power brake-pressure generator 3, and next to it, a simulator-cylinder bore is placed, which forms simulator cylinder 17. In the position of installation and use, the power-cylinder bore and the simulator-cylinder bore, and consequently power cylinder 9 and simulator cylinder 17, are horizontal. Above power cylinder 9, that is, between power cylinder 9 and upper side 25, a brake-master-cylinder bore forming brake master cylinder 2 is placed in hydraulic block 24 parallel to upper side 25 and parallel to motor side 26, the brake-master-cylinder bore likewise running horizontally and perpendicular to power cylinder 9 and simulator cylinder 17 in the position of installation and use.

A circular dashed line marks groove 27 encircling power piston 8 between the two piston seals 21, which cannot be seen in FIG. 3, at the inner circumference of power cylinder 9, that connects brake-fluid line 22, which comes from pedal-travel simulator 16, to brake-fluid line 23 which leads to brake-fluid reservoir 13. Brake-fluid line 23 leads vertically upward to a counterbore 28 in upper side 25 of hydraulic block 24 for a connecting nipple of brake-fluid reservoir 13. The connecting nipple (not shown) of brake-fluid reservoir 13 inserts into counterbore 28 when brake-fluid reservoir 13 is mounted on upper side 25 of hydraulic block 24, so that brake-fluid reservoir 13 communicates with brake-fluid line 23. Brake-fluid line 23 runs from above into groove 27 of power cylinder 9.

Brake-fluid line 22 from pedal-travel simulator 16 intersects simulator cylinder 17, which is horizontal in the position of installation and use, at an upper side and runs radially into groove 27 of power cylinder 9. Because brake-fluid line 22 is connected to simulator cylinder 17 at the top, air possibly contained in the brake fluid is forced with the brake fluid out of simulator cylinder 17 at the back end of simulator piston 18 and passes through brake-fluid lines 22, 23 and groove 27 of power cylinder 9, as represented by arrow 29, into brake-fluid reservoir 13, where the air escapes from the brake fluid. In the position of installation and use of hydraulic block 24 illustrated, simulator cylinder 17 is situated lower than power cylinder 9, so that air bubbles escape upward out of simulator cylinder 17.

Brake master cylinder 2, which is used as setpoint generator for the brake pressure to be generated by power brake-pressure generator 3, is activated upon each power braking. Simulator valve 15 is opened, with the result that brake master cylinder 2 displaces brake fluid into simulator cylinder 17. Simulator piston 18 thereby moves in simulator cylinder 17 and forces brake fluid at its back end out of simulator cylinder 17 through brake-fluid line 22, groove 27 going around power piston 8 in power cylinder 9 between the two piston seals 21, and brake-fluid line 23 into brake-fluid reservoir 13 (see FIG. 2), where air bubbles possibly contained in the brake fluid escape from the brake fluid. Upon release of brake master cylinder 2, the brake fluid is sucked again in reverse direction out of brake-fluid reservoir 13 at the back end of simulator piston 18 into simulator cylinder 17.

Because brake fluid is located in simulator cylinder 17 at the front end and at the back end of simulator piston 18 and in groove 27 between the two piston seals 21, simulator piston 18 and piston seals 21 are lubricated from both ends with the brake fluid.

Figure 2:
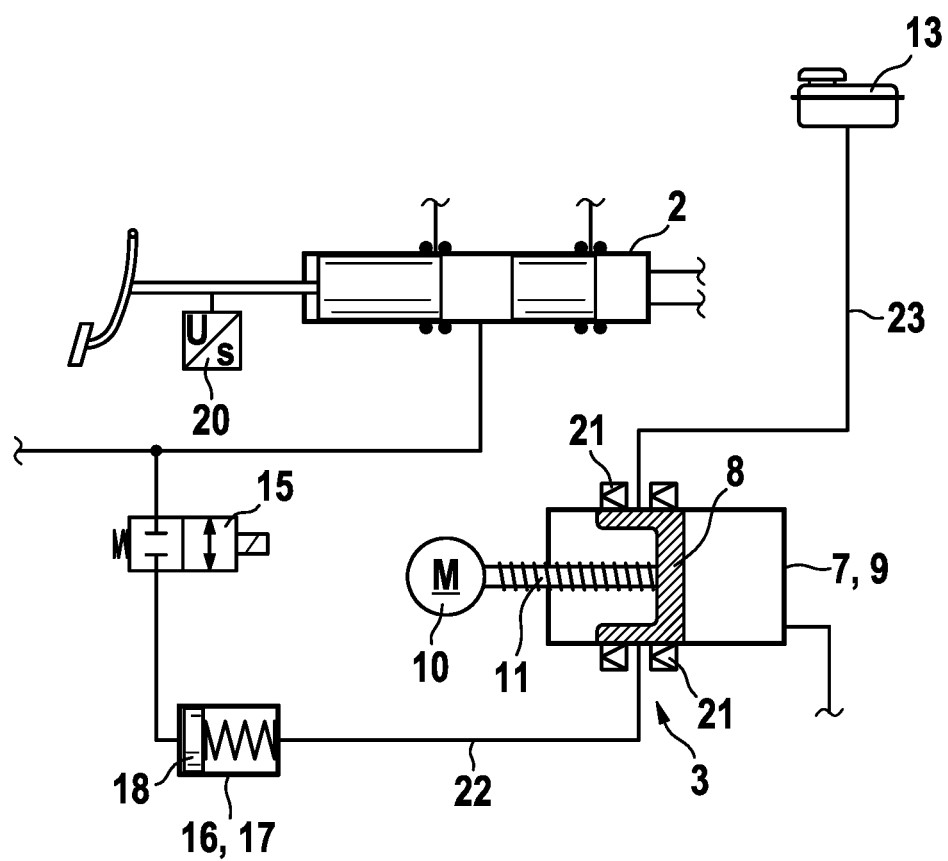
FIG. 2 shows component parts from the hydraulic circuit diagram of FIG. 1, in accordance with an example embodiment of the present invention.

As described above, owing to the fact that upon each movement of simulator piston 18 in simulator cylinder 17, brake fluid flows into groove 27 going around power piston 8 in power cylinder 9 between the two piston seals 21, both piston seals 21 become lubricated. Due to its back and forth movement in power cylinder 9, power piston 8 brings brake fluid out of groove 27 to both piston seals 21. As can be seen in FIG. 2, both piston seals 21 are lamellar labyrinth seals, that is, seals able to be overflowed in only one direction in the manner of non-return valves. Because no brake fluid gets via piston seal 21 on the high-pressure side (on the right in the figure) to the piston seal on the low-pressure side (on the left in the figure), the supply of brake fluid between the two piston seals 21 is important for the lubrication of piston seal 21 on the low-pressure side.

Vehicle brake system 1 may be evacuated as customary in the case of slip-controlled vehicle brake systems, and subsequently filled with brake fluid preferably under pressure. However, filling without evacuation is also possible, in that brake fluid, under pressure or pressureless, is filled by brake-fluid reservoir 13 into vehicle brake system 1. With simulator valve 15 open, brake master cylinder 2 is subsequently actuated repeatedly and displaces brake fluid into simulator cylinder 17 at the front end of simulator piston 18, so that simulator piston 18 is shifted in simulator cylinder 17. At its back end, simulator piston 18 forces brake fluid out of simulator cylinder 17 through brake-fluid line 22, groove 27 going around power piston 8 in power cylinder 9 between the two piston seals 21, and brake-fluid line 23 into brake-fluid reservoir 13, where air contained in the brake fluid escapes. Upon release of brake master cylinder 2, the brake fluid is sucked again without air (!) in reverse direction out of brake-fluid reservoir 13 at the back end of simulator piston 18 into simulator cylinder 17. By repeating several times, simulator cylinder 17 is evacuated at the back end (and also at the front end) of simulator piston 18.

What is claimed is:

1. A hydraulic power vehicle brake system, comprising:
a brake master cylinder;
a brake-fluid reservoir;
a power brake-pressure generator;
a hydraulic wheel brake which is operable by the power brake-pressure generator; and
a pedal-travel simulator which includes a piston/cylinder unit having a simulator piston that is displaceable in a simulator cylinder, the simulator cylinder being connected at a front end of the simulator piston to the brake master cylinder, and the simulator cylinder is connected at a back end of the simulator piston to the brake-fluid reservoir, wherein the power brake-pressure generator includes a second piston/cylinder unit having a power piston sealed by two axially offset piston seals in a power cylinder, and at the back end of the simulator piston, the simulator cylinder is connected to the brake-fluid reservoir via at least one brake fluid line that travels between the two piston seals of the second piston/cylinder unit of the power cylinder.

2. A hydraulic power vehicle brake system, comprising:
a brake master cylinder;
a brake-fluid reservoir;
a power brake-pressure generator;
a hydraulic wheel brake which is operable by the power brake-pressure generator; and
a pedal-travel simulator which includes a piston/cylinder unit having a simulator piston that is displaceable in a simulator cylinder, the simulator cylinder being connected at a front end of the simulator piston to the brake master cylinder, and the simulator cylinder is connected at a back end of the simulator piston to the brake-fluid reservoir, wherein the power brake-pressure generator includes a second piston/cylinder unit having a power piston sealed by two axially offset piston seals in a power cylinder, and at the back end of the simulator piston, the simulator cylinder is connected between the two piston seals of the second piston/cylinder unit of the power cylinder, to the brake-fluid reservoir, wherein the power cylinder has a circumferential groove between the two piston seals which goes around the power piston and which connects the simulator cylinder at the back end of the simulator piston, to the brake-fluid reservoir.

3. The hydraulic power vehicle brake system as recited in claim 1, wherein the simulator cylinder is connected at the back end of the simulator piston to the brake-fluid reservoir, at a position of the simulator cylinder which is located at a first end of the simulation cylinder in a position of installation and use.

4. The hydraulic power vehicle brake system as recited in claim wherein in a position of installation and use, the simulator cylinder is situated lower than the power cylinder.

5. A method for filling a hydraulic power vehicle brake system with brake fluid, the vehicle brake system including a brake master cylinder, a brake-fluid reservoir, a power brake-pressure generator, a hydraulic wheel brake which is operable by the power brake-pressure generator, and a pedal-travel simulator which includes a piston/cylinder unit having a simulator piston that is displaceable in a simulator cylinder, the simulator cylinder being connected at a front end of the simulator piston to the brake master cylinder, and the simulator cylinder is connected at a back end of the simulator piston to the brake-fluid reservoir, the method comprising:
filling the brake fluid, by the brake-fluid reservoir, into the vehicle brake system, and repeatedly actuating the brake master cylinder so that the simulator piston moves back and forth repeatedly in the simulator cylinder and in so doing, repeatedly forces brake fluid at the back end of the simulator piston out of the simulator cylinder into the brake-fluid reservoir and sucks brake fluid back again at the back end of the simulator piston out of the brake-fluid reservoir into the simulator cylinder, wherein the power brake-pressure generator includes a second piston/cylinder unit having a power piston sealed by two axially offset piston seals in a power cylinder, and at the back end of the simulator piston, the simulator cylinder is connected to the brake-fluid reservoir via at least one brake fluid line that travels between the two piston seals of the second piston/cylinder unit of the power cylinder.

* * * * *